Oct. 23, 1951 P. J. L. JULLIEN 2,572,811
CALCULATING MACHINE
Filed April 18, 1949 7 Sheets-Sheet 1
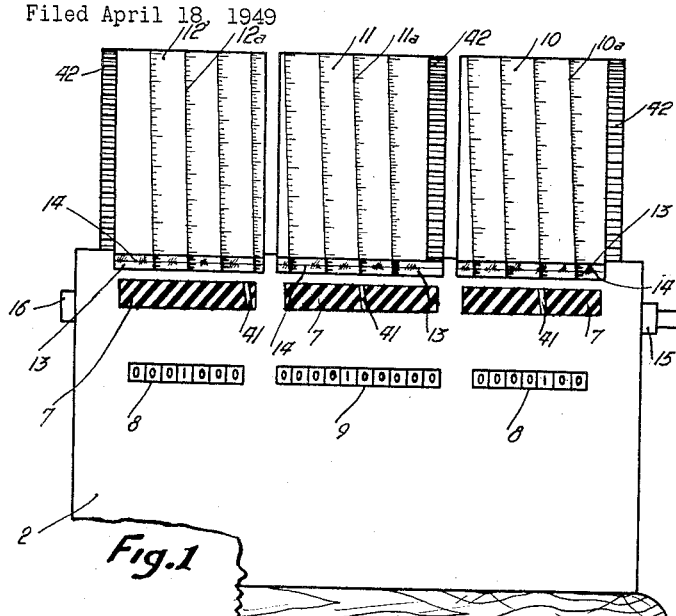
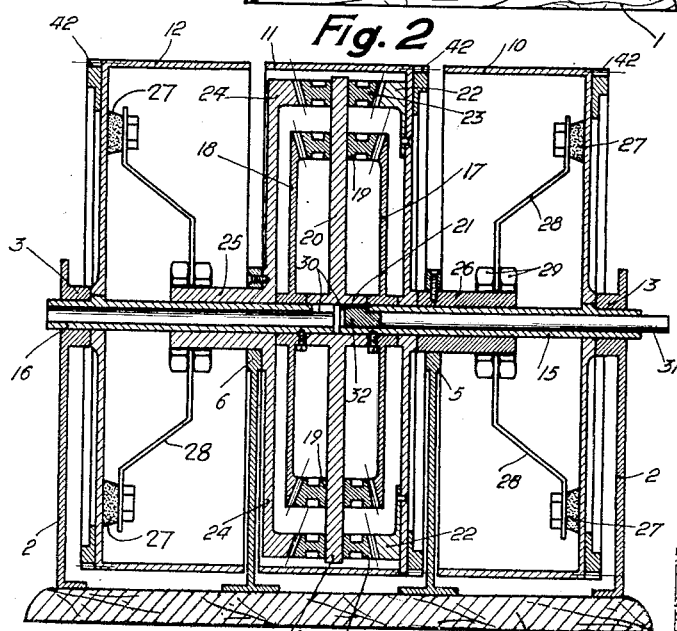
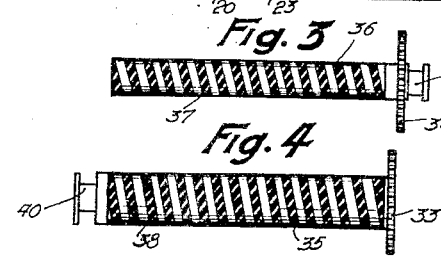
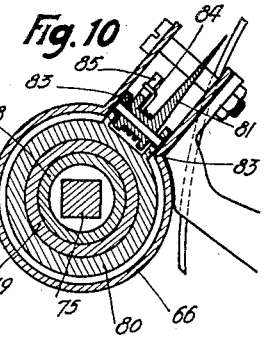
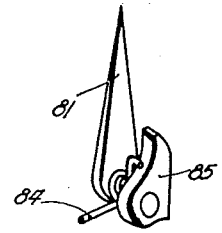
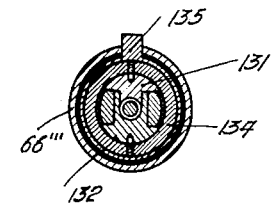
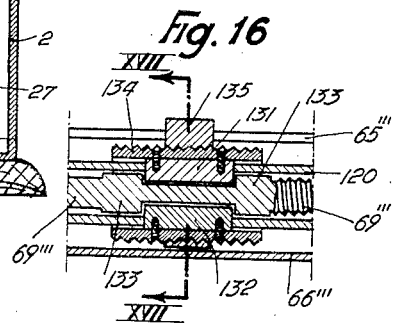
INVENTOR.
PIERRE, JULES LOUIS JULLIEN,
Allen & Allen
ATTORNEYS.

Oct. 23, 1951 P. J. L. JULLIEN 2,572,811
CALCULATING MACHINE
Filed April 18, 1949 7 Sheets-Sheet 2

INVENTOR.
PIERRE, JULES LOUIS JULLIEN,
BY
ATTORNEYS.

Oct. 23, 1951 P. J. L. JULLIEN 2,572,811
CALCULATING MACHINE
Filed April 18, 1949 7 Sheets-Sheet 3
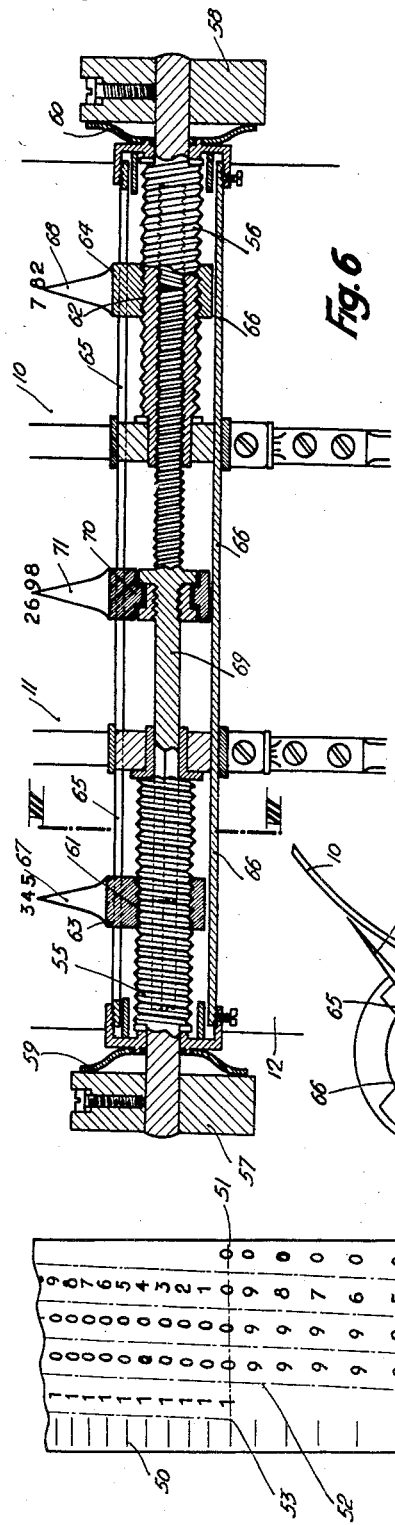
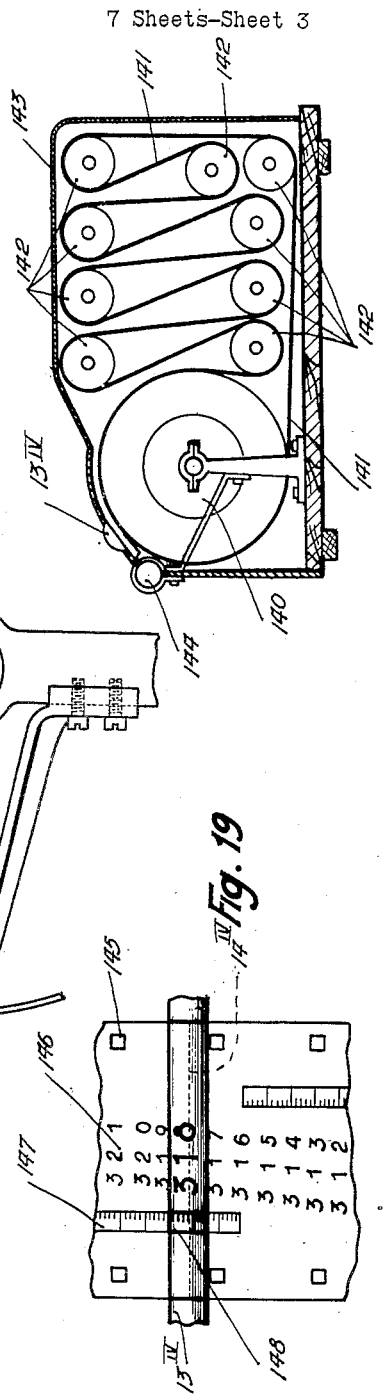
INVENTOR.
PIERRE, JULES LOUIS JULLIEN,
ATTORNEYS.

Oct. 23, 1951  P. J. L. JULLIEN  2,572,811
CALCULATING MACHINE
Filed April 18, 1949  7 Sheets-Sheet 4
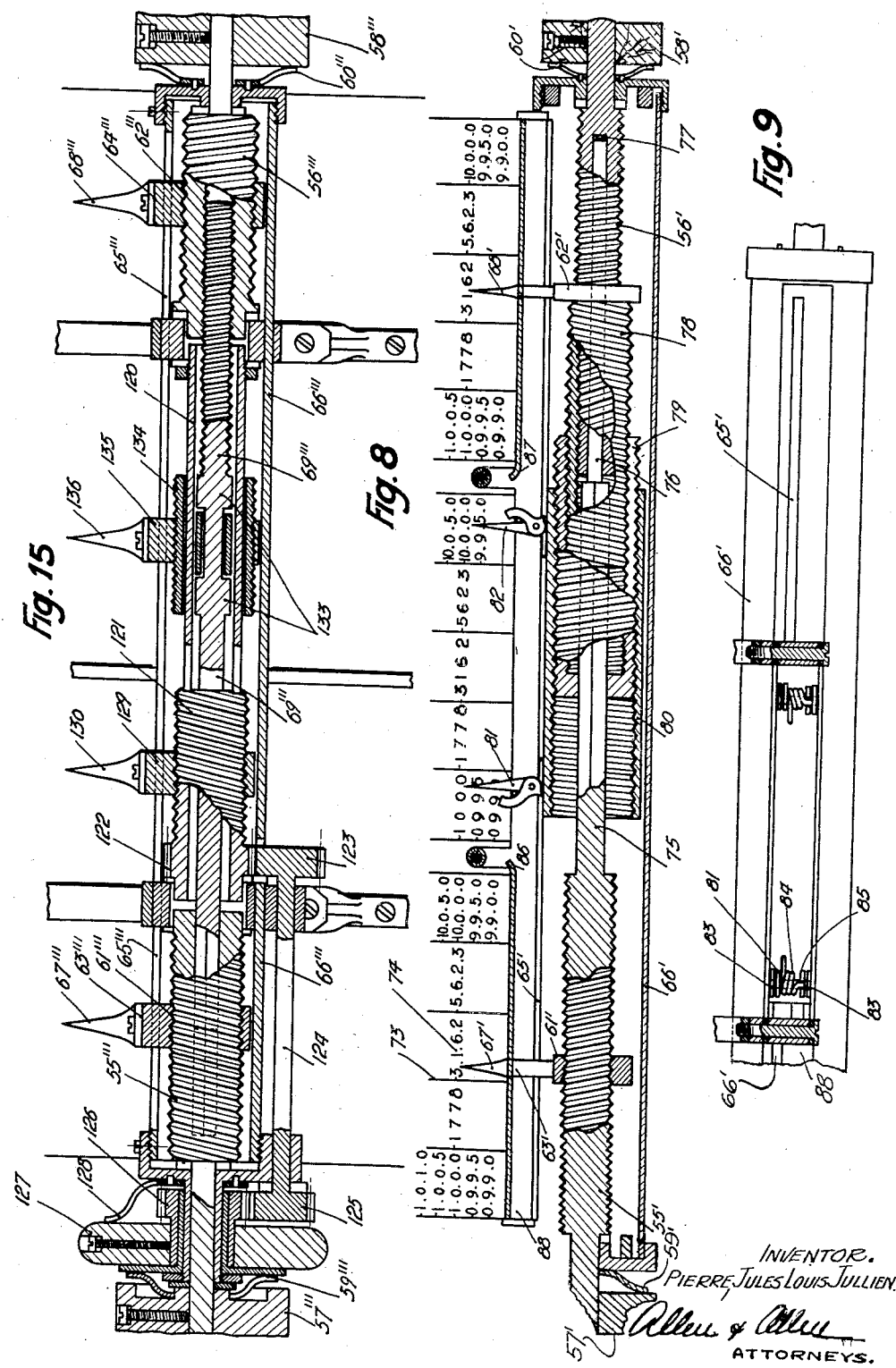
INVENTOR.
PIERRE JULES LOUIS JULLIEN
ATTORNEYS.

Oct. 23, 1951  P. J. L. JULLIEN  2,572,811
CALCULATING MACHINE
Filed April 18, 1949  7 Sheets-Sheet 5

INVENTOR.
PIERRE, JULES LOUIS JULLIEN,

ATTORNEYS.

Oct. 23, 1951  P. J. L. JULLIEN  2,572,811
CALCULATING MACHINE
Filed April 18, 1949  7 Sheets-Sheet 6
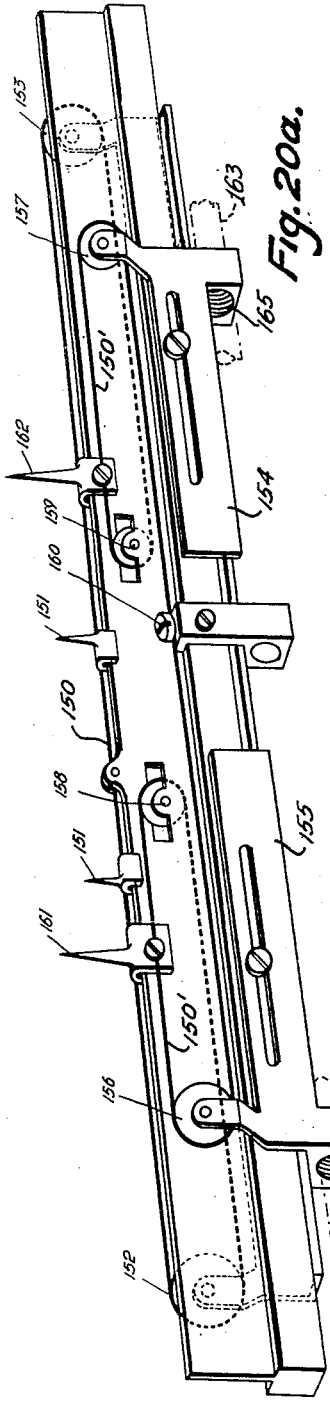
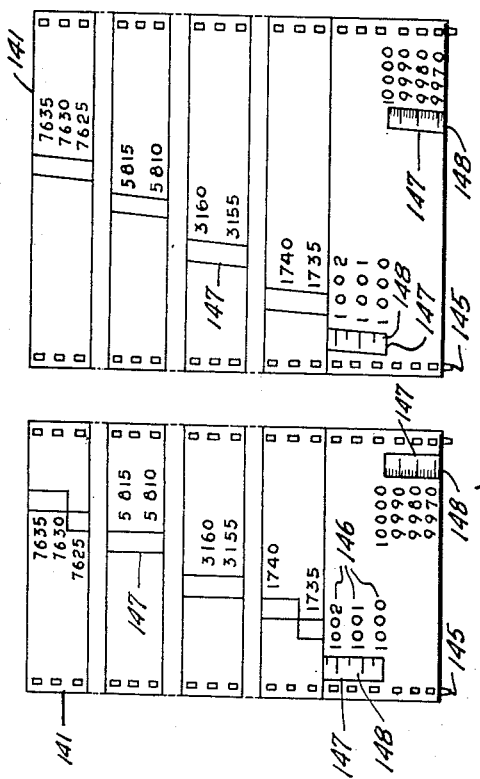
INVENTOR.
PIERRE, JULES LOUIS JULLIEN,
BY
ATTORNEYS.

Oct. 23, 1951     P. J. L. JULLIEN     2,572,811
CALCULATING MACHINE
Filed April 18, 1949     7 Sheets-Sheet 7
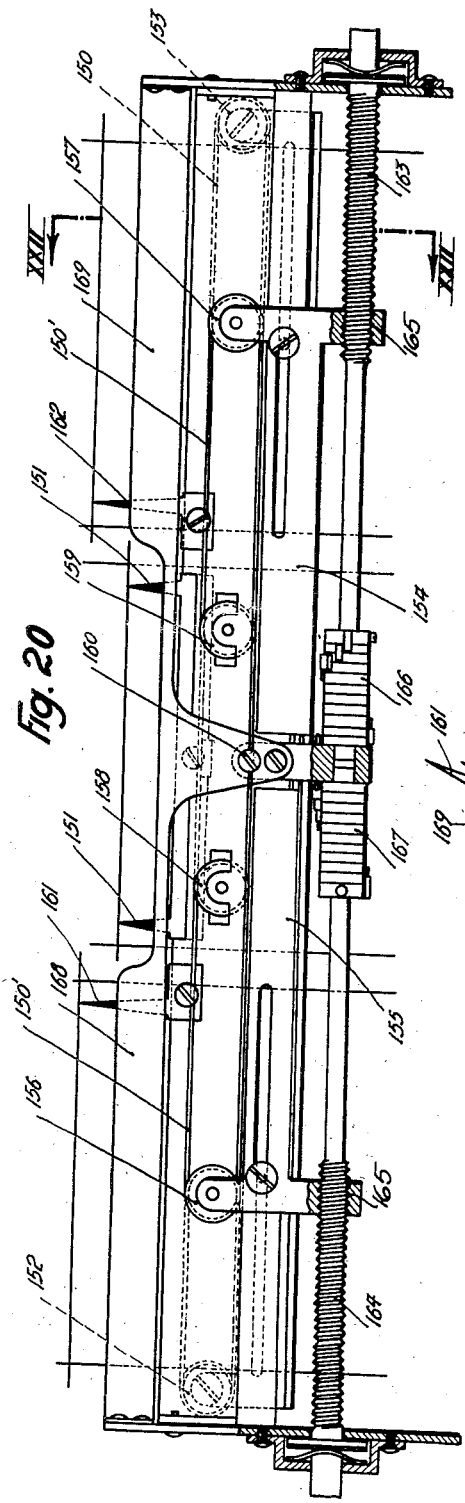
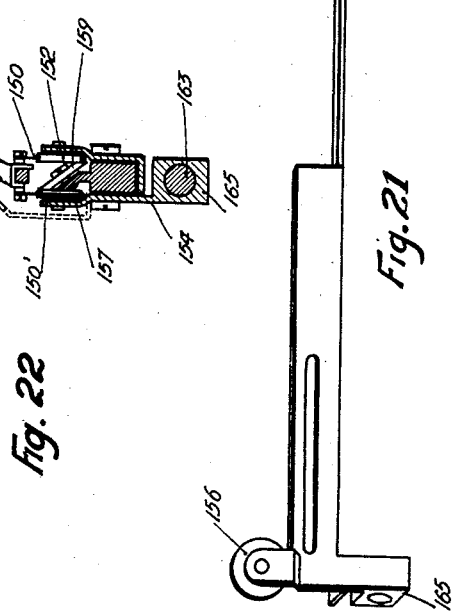
INVENTOR.
PIERRE, JULES LOUIS JULLIEN,
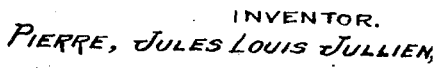
ATTORNEYS.

Patented Oct. 23, 1951

2,572,811

UNITED STATES PATENT OFFICE 2,572,811

CALCULATING MACHINE

Pierre Jules Louis Jullien, Roubaix, France

Application April 18, 1949, Serial No. 88,147
In France April 20, 1948

8 Claims. (Cl. 235—79.5)

Slide-rules and the like used for logarithmic calculation have various drawbacks resulting, in particular, from the limitation of the length of the calculation base and from the complication arising from the absence of any decimal indication and stationary reading marks, which prevent them from being used on a large scale.

This invention has for its object a calculating machine of simple construction based on logarithmic principles which overcomes said various drawbacks.

The calculating machine, according to the present invention comprises logarithmic scales carried at the periphery of at least three co-axial revolution surfaces, e. g. drum, moving with respect to a stationary index, said co-axial revolution surfaces being connected with each other through differential gears. Opposite each revolution surface there is a transversely movable index, the transverse displacement of the index of one drum being the sum of the transverse displacements of the indices of the other drums.

It is possible to design a 3- or 4-term calculating machine. In a 3-term machine two drums hereinafter called "factor-drums" are each integral with one sun-wheel of a differential gear. A drum hereinafter called "result-drum" carries a toothed disc constituting, together with a similar disc fixed with respect to the frame of the machine, and planet-wheels carried by the planet-wheel-carrier of the angle-adding differential gear, a second differential gear; in this embodiment the rotation angle of the result-drum is equal to and has the same sign as the sum of the rotation angles of the two factor-drums.

This machine may be adapted for effecting 4-term calculations. The differential device constituting the basis of the calculating machine, as hereabove stated, comprises four sun-wheels co-operating pairwise through planet-wheels. In order to permit of entering a fourth term, that sun-wheel which is fixed with respect to the frame is released therefrom and made integral with a fourth drum carrying a logarithmic scale, of direction opposite to those carried by the three other drums. Said sun-wheel may also be made integral with the frame solely through a declutching device; the result drum may then be released from the factor drums and a first term of the operation to be effected may be entered on said result-drum. This last device may be more especially interesting where a compact machine is aimed at, but it requires a shift between the drums involving difficult zero re-setting between the different operations.

In this machine there is preferably added to the so-called result drum and 4th term drum a device permitting one or the other of said drums to be locked.

The logarithmic scale may be helically wound on the periphery of the drum, one revolution of the drum corresponding, e. g. to the base 10, the base 100 corresponding to two drum revolutions, and so on; but the base 10 of the logarithmic scale may also be developed over any desired number of drum revolutions.

The characteristic of a number may, when the logarithmic scale wound on one drum revolution corresponds to the base 10, be represented by a number of drum revolutions $n$ equal to said characteristic, and when the mantissa corresponds to a fractional revolution $0.m$, said drum revolutions may be represented by a linear displacement along a generatrix equal to the pitch of the wound helix; the characteristic $n$ of a number thus corresponds to a linear displacement of $n$ times the helix pitch and a mantissa equal to $0.m$ corresponds to a displacement of $0.m$ times the helix pitch; a displacement of $n$ plus $0.m$ times the helix pitch along the generatrix thus characterizes the number. This marking of the number is far less accurate however than the marking through the rotation angle of the drum; it is, in effect a function of the ratio of the helix pitch to the circumferential development of the drum.

The marking device with separate control may be used for indexing the concerned column in the drums using wound logarithmic scales.

The linear displacements of the indices may also be used to determine the decimal points.

For this purpose, if the logarithmic scale of base 10 is wound on a drum over one revolution it is necessary that for a variation of one unit in the characteristic, i. e. for a displacement equal to the revolution pitch, a shift be produced from one figure column of the number representing the mantissa to the next column.

The figures constituting the decimal numbers corresponding to the divisions of each graduated logarithmic scale are thus arranged in the decimal order at the intersection points of a helix wound on the drum with the generatrix of the cylinder. The point should be put in for each factor and the point mark of each one of the three drums should be able to effect a correlative transverse displacement corresponding to the correlative angular displacement of that drum to which it corresponds. For this purpose, the point is represented by a mark moving along the result generatrix. The three marks corresponding to the three drums have displacements related to each other and such that the displacement, along the result generatrix, of the mark of the result drum, is the sum of the displacements along their respective generatrices of the marks of the factor drums. If the point mark of one factor drum is brought into a position corresponding to a logarithm $n'+0.m'$ the mark of the result-drum will assume the same position; if the point mark of the second factor-drum is then brought into a position corresponding to $n''+0.m''$ the mark of the result-drum will assume the position corresponding to $n'+n''+0.m'+0.m''$. It will then be understood that with the above mentioned arrangement of the figures, if the mark is set between two figure columns on each one of the two factor-drums, the positions of the two marks representing the point will also represent the logarithms of the factors and that the mark of the result drum will indicate the point on the result-number of said last drum.

Said linear displacements of the indices may even be used for indicating the position of the point on a logarithmic scale helically wound over several drum revolutions. The displacement of the marking index will then be the sum of a displacement of comparatively large amplitude which will correspond to the mantissa $0.m'$ of the number logarithm, and of a displacement of smaller amplitude corresponding to the characteristic of said number, i. e. $f(n)$. It is thus only necessary to arrange the figures constituting the graduation of the scale mark at constant intervals from the helix constituted by the logarithmic scale, the point interval which gives characteristic 1 being spaced from the unit interval of the helix and the other figures being arranged in the following intervals, so as to obtain both the indexing of the concerned turn and that of the location of the point.

The movable mark for indexing the turn of the logarithmic scale may be constituted by the point of intersection of two helices plotted on two co-axial cylinders. These cylinders carry, along a length equal to the overall width of the logarithmic helix on the drum, helical turns of which the pitch is such that the number of helical turns on one of the cylinders is equal to one more than the number of the helical turns on the other cylinder. Said cylinders are rotatively driven by toothed wheels co-operating with one or more toothed-wheels carried by the drum, and so designed that the relative rotation of the cylinders with respect to one another is equal to one rotation for a number of drum rotations equal to the number of rotations of the logarithmic helix of base $10$. This device offers the advantage over the screw-driven devices in that it is shifted from one end point to the other automatically as soon as the width of the drum has been traversed.

However, with this movable indicating device, the displacement of the movable mark is related to the motion of the drum. This correlative drive requires for putting down one of the factors the rotation of the drums by a number of turns varying according to the number of turns on which the logarithmic scale is helically wound, but in any case proportional to the characteristic of the number to be put down.

It is possible to make the indicating device independent of the drums. The movable indicating device is, to this effect, driven by a differential system independent of the arc-adding differential system of the drums.

Finally each of the logarithmic scales may, instead of being helically wound on a drum, be located on a tape driven by each of the drums. In order to avoid the error which might result from the sliding and resiliency of the tape, there is interposed between said tape and the drum, a driving device known, inter alia, for driving cinematographic films, which consists in providing said tape with punchings adapted to be engaged by lugs carried by the drum. Moreover, so as to obtain the same accuracy as with the machine which is not provided with a tape and to make use of the width reduction which is made possible by the plotting of the figures on a tape, there are arranged scales plotted on the drum and the tape is provided with longitudinal sighting-slits which successively expose the various scales, the visible scale corresponding to the logarithmic notation carried by the tape opposite said sighting-slit.

In the accompanying drawings, illustrative embodiments of the calculating machine according to the invention have been shown.

In these drawings:

Fig. 1 is a general front view of the calculating machine;

Fig. 2 is a longitudinal sectional view taken on the rotation axis of the mechanism;

Figs. 3 and 4 are elevational views of parts of the indicating device;

Fig. 5 is a view of a portion of the scale carried by one drum of a machine using the point-indexing device;

Fig. 6 is a longitudinal sectional view of a point-indexing device;

Fig. 7 is a cross-sectional view taken on the line VII—VII of Fig. 6;

Fig. 8 is a view of a device as shown in Fig. 6, adapted to a machine in which the base logarithmic scale is helically wound over several drum turns;

Fig. 9 is a partial plan view of the device showin in Fig. 8;

Fig. 10 is a cross sectional view of Fig. 9 on an enlarged scale;

Fig. 11 is a detail perspective view of the disappearing index;

Fig. 15 is a view similar to Fig. 6 of a 4-term machine;

Fig. 16 is a detail view of Fig. 15;

Fig. 17 is a sectional view along the line XVII—XVII of Fig. 16;

Fig. 18 is a section through a tape-machine;

Fig. 19 is a detail view of Fig. 18;

Figure 19a is a fragmentary plan view of portions of the tape showing the disposition of the opening therein;

Fig. 20 is an alternative embodiment of a device for driving the point-indexing marks;

Figure 20a is a perspective view of Figure 20;

Figure 20b is a diagrammatic view of the pulleys, rules and cord, to facilitate an understanding of Figures 20 and 20a;

Fig. 21 is a detail view of a pulley-carrying rule of the machine of Fig. 20;

Fig. 22 is a sectional view along the line XXII—XXII of Fig. 20.

Figure 1A:
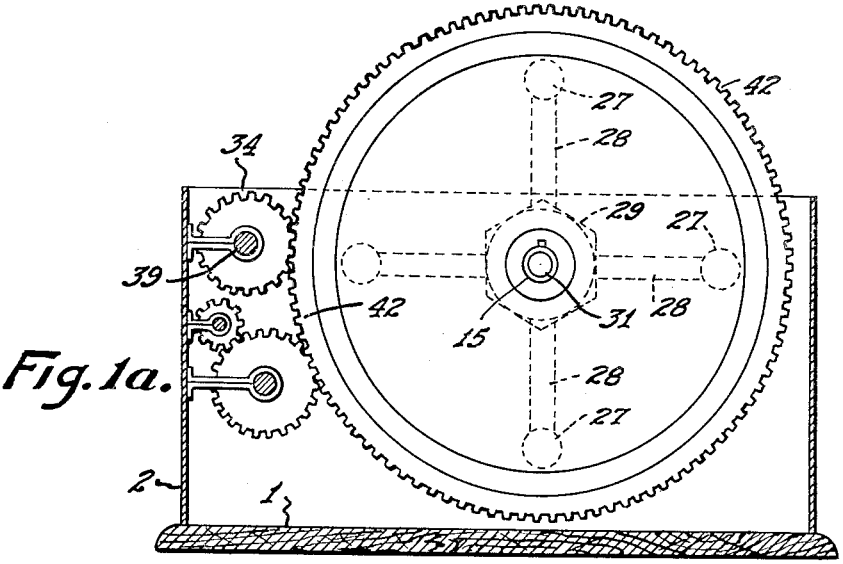
Figure 1a is an end view of Figure 1 with the end of the casing removed.
Figure 20B:
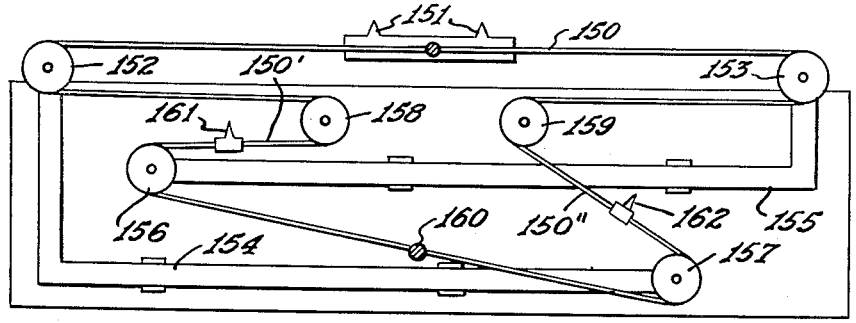
Figure 18A:
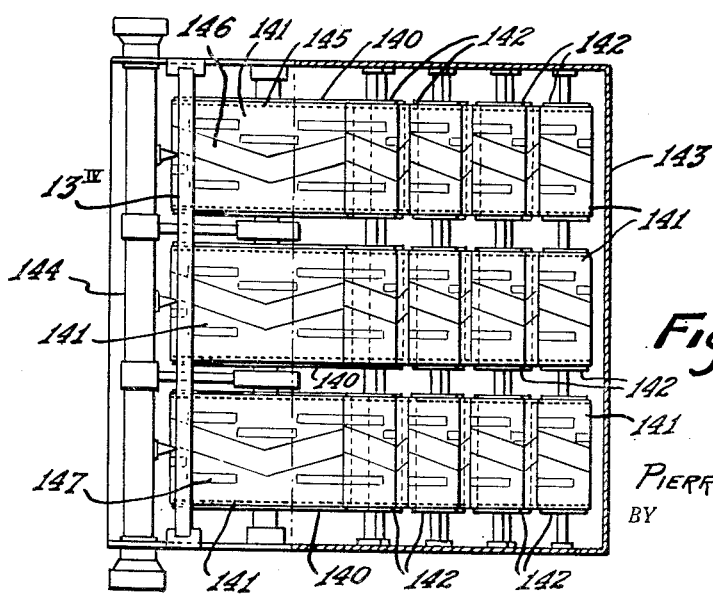
Figure 18a is a plan view of Figure 18 with parts of the casing removed.

The machine is secured on a wooden base 1 surmounted by a sheet metal frame 2 carrying bearings 3 which constitute the end bearings of the machine shaft; intermediate bearings 5 and 6 co-axial with bearings 3 are also carried by said base. In the front portion of frame 2 are provided sighting-slits 7 in which appear the indicating devices of each drum, which devices will be described hereinafter, and sighting-slits 8 and 9 for the turn-counting devices, the operation of which will also be described hereinafter.

The calculating device of the machine comprises essentially three drums 10, 11 and 12 on the surface of which are engraved three similar logarithmic scales, 10a, 11a and 12a. Said scales correspond in the example described to a logarithmic division of base 10 and are helically wound over 4 drum turns. Said drums are centered on the general axis of the machine and rotate with respect to a stationary mark constituted by a glass strip 13 carrying on its face nearly in contact with the drum an index 14, and the upper face of which is such that the glass strip acts as a magnifying lens for reading the graduations. The glass strip 13 is carried by frame 2 of the machine.

Drums 10 and 12, called factor-drums, are respectively integral with the shaft members 15 and 16, mounted in the bearings 3 and 5 and 3 and 6. Said shafts 15 and 16 carry respective toothed-discs 17 and 18 opposed to one another, housed within drum 11 and constituting the sun-wheels of a differential gear. The two planet-wheels 19 of said differential gear are diametrically opposed and mounted on a spindle 20 freely mounted by means of a collar 21 formed in its mid-portion on the adjacent ends of shafts 15 and 16.

A bevel gear 22 is secured on the inner face of drum 11 and meshes with two bevel pinions 23, diametrically opposed and freely rotatively mounted at the ends of the spindle 20, which in turn mesh with a bevel gear 24 opposed to the bevel gear 22. The members 22, 23 and 24 constitute the second differential gear, said bevel gear 24 being integral with bearing 6 and therefore fixed with respect to the frame.

On a sleeve 25, integral with the gear 24, and on a sleeve 26, integral with bearing 5 (thus both stationary, and surrounding shafts 15 and 16 respectively) are secured drum brakes each constituted by two leather pads 27 secured at both ends of a resilient blade 28 blocked between two nuts 29. The shape of blade 28 is such that said pads are forced against the bottoms of the drums and resist their free rotation.

Besides, spindles 15 and 16 are hollowed and carry on their contiguous ends, in the same plane of orientation of the drums 10 and 12, the longitudinal slots 30. A rod 31 inserted into shaft 15 carries a movable cotter 32 which may make said spindles integral with one another by being engaged simultaneously into both slots 30.

The drums also carry on their side faces the toothed-wheels 42 which will have, e. g. four hundred and twenty teeth. Each of these toothed-wheels meshes, with a small clearance, with two toothed-wheels 33 and 34 having twenty and twenty-one teeth respectively, integral, one with a hollow cylinder 35, the other with a cylinder 36 adapted to be telescoped into cylinder 35 to bring the toothed wheels 33 and 34 together so as to mesh with one of the toothed wheels 42. On cylinder 36 are represented along a length equal to the width of the four logarithmic helices on any one of the drums, sixteen helical turns 37, e. g. black, separated by white helical turns. On the transparent portion of cylinder 35 and along a similar length are arranged fifteen opaque helical turns separated by fifteen transparent helical turns. Said cylinders are introduced into each other and the whole assembly is mounted on the machine frame by means of spindles 39 and 40 so that the portion provided with the helix is located opposite a sighting-slit 7 of frame 2 and so that wheels 33, 34 mesh with a wheel 42, the gear clearance being sufficient for permitting this mounting. The cylinders being thus telescoped, the helical turns of different pitches overlap more or less. The white turns of cylinder 36 coincide only at one point with the transparent turns of cylinder 35; it is this coincidence which is used as an indicating means for indexing on what helical turn of the helix the reading is to be made as shown at 41 in Figure 1. It will be understood that there is an assembly as described above for each of the drums 10, 11 and 12.

Finally, a device of revolution-counter type, known per se, the face of which appears in the sighting-slits 8 or 9 is combined with each assembly and is such that at each fourth revolution of the corresponding drum effected in the increasing direction of the logarithmic scale, the visible marking figure is shifted from the column in which it is then located to the next left-hand column as shown in the figure and vice-versa.

The assembly and the fixing of the drums are so effected that the zeros of the three drums originally coincide and that the indicia 41 are then located, as well as the indicating figures of sighting-slits 8 and 9, fully on the right of their respective sighting-slits.

Let us assume that a multiplication is to be effected; drum 10 is rotated in the direction of the increasing logarithmic scale, so as to bring into the corresponding sighting-slit 8, the decimal order in which said figure is located, e. g.; 100 if the multiplier is comprised between 100 and 999 (for this purpose, the drum should be rotated by eight consecutive revolutions). Drum 12 being locked by its brake 27, sun-wheel 18 remains stationary and drum 11 rotates also by 8 revolutions; number 100 thus also appears in sighting-slit 9. Said figures translate into decimal fractions the characteristics of the logarithms of the figures. From this moment, drum 10 is further rotated so as to bring the graduation of scale 10a corresponding to the number opposite the index 14; for this purpose, the drum should be rotated by a number of revolutions plus a certain arc. Now, index 41 of the corresponding sighting-slit is always in coincidence with the logarithmic turn which is concerned; in effect, the toothed-wheels driving the cylinders of the indicating device and wheel 32 have such numbers of teeth that both said cylinders are imparted with a relative displacement of one revolution when the drum has been rotated by four revolutions, and therefore the coincidence point of the helices describes the whole helix-length for four drum revolutions.

The multiplier being put in on scale 10a, drum 10 locked by its brake 27 is left alone and the multiplicand is put in on scale 12a. This drum must first be rotated a number of turns so as to bring into the corresponding sighting-slit 8 the decimal order. However, drum 11 driven by the differential gear describes the same number of revolutions. If, as in the shown assembly, the multiplicand is comprised between 1000 and 9999, number 1000 will be brought into the corresponding sighting-slit and the figure appearing in sighting-slit 9 will be 100,000. Drum 11, once this operation is completed, will have effected twenty revolutions plus an arc from zero to 1440 degrees proportional to the mantissa of the multiplier. The division of the graduation 12a corresponding to the multiplicand-number is then brought opposite to index 14 and for this purpose, said drum must be rotated by a certain arc ranging from 0 to 1440 degrees; during this operation, drum 11 rotates by the same arc. At the end of the operation, the value of the result is directly read on scale 11a, opposite the mark 41, the demical order of said value being read in sighting-slit 9. It is to be noted that if the sum of the mantissae of the multiplier and multiplicand is higher than unity, the marking figure in sighting-slit 9 will have been shifted by one column from the position shown in Figure 1, while the value of the multiplicand was put in said marking figure will thus index the million order and the result will be comprised between 1,000,000 and 9,999,999.

To square a number, it is clear that it is possible to operate as described above, but it is preferable to make the drums 10 and 12 integral with one another by means of the cotter 32. The drum 11 will then rotate at a speed double that of either factor-drum. It is then sufficient to put in the figure on either one of the drums 10 or 12 to read its square on drum 11. The same operation, but putting in the figure on drum 11 gives its square root on either one of the drums 10, 12.

The machine described above as in illustration is adapted to be modified in many ways.

The arrangement of the scales permits an easy inscription of auxiliary or special graduations (such as 100—n, e. g. for the calculation of commercial discounts) besides the normal graduations. Besides the logarithmic scales, arithmetic scales for addition and subtraction may be arranged.

The graduated scale portion shown in Figure 5 comprises a logarithmic graduation 50; it is constituted by a usual logarithmic graduation of base 10 helically wound on one cylinder turn and engraved on the left end of said cylinder. On the periphery of the cylinder is plotted a helix (not shown) starting from a point selected on the generatrix 51 of the cylinder corresponding to the origin of the graduation. On the scale portion shown said helix is wound on four complete turns. But any number of turns may be selected according to the width of the cylinder and the helix pitch. The figures constituting the decimal number corresponding to each logarithmic graduation are engraved in the decimal order from left to right at the points of intersection of the helix with the generatrix of the cylinder corresponding to said graduation.

In the example shown, the decimal numbers will thus have four figures and all figures will be located along the above defined helix. In the helix interval formed by the figures, is engraved a helix 52 in broken lines. If the circle passing through point 53 is looked upon as an origin, the distance between the point of intersection of any generatrix with the spiral to said circle 53 will be proportional to the logarithm of the decimal number read on the numbered scale, said point of intersection being taken as a point. Thus if a calculating machine of the above described type provided with drums as described above is associated with three indicia so related that the displacement of the indication of the result-drum be the sum of the positive or negative displacements of the indicia of the factor-drums, and if the indicia of the factor-drums are movable independently of said drums, it may be operated in the following manner: The divisions of the logarithmic scale corresponding to the factors to be put in are brought into coincidence with the index lines 14 by rotating the factor-drums in either direction. The logarithmic result appears on the result-drum. Each of the point marks of the factor-drums is then brought to that point of intersection of the helix 52 with the index line 14 which corresponds to the position of the point on the particular factor. The mark of the result drum then comes to a position giving the point on the result-number.

The index driving device is shown in Figures 6 and 7. It comprises essentially two threaded rods 55 and 56 controlled by knurled knobs 57 and 58 and braked by 4-arm springs 59 and 60. Said threaded rods co-operate respectively with the nuts 61 and 62 locked against rotation by the lug 63 and 64 which slides in a longitudinal slot 65 provided along a generatrix of a tube 66 within which the device is enclosed.

The rotation of rod 55 moves nut 61 and the index hereinafter called "point-mark" 67 integral therewith with respect to drum 12 of the machine carrying the logarithmic graduation described above.

The rotation of rod 56 similarly moves an index 68 with respect to drum 10 similar to drum 12 mentioned above.

The threaded rod 55 is drilled axially with a square bore and rod 56 is threaded interiorly. In the inner thread of rod 56 is screwed a threaded rod 69 extended by a square spindle which penetrates into, and is capable of non-rotative longitudinal sliding movement with respect to the square bore of rod 55.

The pitches of the threads of rod 55 and of rod 69 are equal and of opposite directions. Thus when rod 55 rotates in one direction while driving rod 69, nut 63 and rod 69 move in the same direction by the same distance. The pitches of the threads of rod 56 and of rod 69 are equal and of the same direction so that, when rod 56 rotates in one direction, nut 64 and rod 69 still move in the same direction by the same distance.

A cylindrical ring 70 is freely mounted on said rod 69 and locked against relative longitudinal movement. It is provided with an index 71 similar to indices 67 and 68, and has a lug 72 similar to the lugs 63 and 64 sliding in the same slot 65 of tube 66.

The longitudinal displacements of said three indices are consistent with the rule stated above; they constitute therefore one of the devices which may be used for embodying the invention. However it is clear that other devices may be substituted therefor and, inter alia, that described above in connection with Figures 3 and 4, modified so as to make its control independent of the rotation of the drums. It is however to be noted that in this case one of the tubes, 35 or 36 may be made stationary in the devices co-operating with the factor-drums, the tubes 35 and 36 of the result-drum device being respectively connected with the movable tube of each one of the factor-drum devices, one of the tubes rotating in the same direction as that which controls it and the other in the opposite direction, so that both tubes 35 and 36 are movable tubes in the result-drum device.

The device shown in Figure 8 co-operates with a calculating machine on each one of the three drums of which is engraved a helix 73 having a logarithmic scale 74 engraved on the right side thereof. The scale numbers are engraved from left to right with digits spaced by the same interval $d$, the first digit being spaced by half an interval from helix 73. It is known that if the logarithmic divisions of the factors of two end drums are brought opposite the index line 14, the logarithmic division of the central drum which is located opposite to the index line is the division of the result. This is true, without it being necessary to rotate the so-called factor-drums by a determined revolution, the position being the same, with any number of revolutions. It remains to determine the turn concerned. Now, the spacing of said turn from helix 73 at the left end of the drum (origin circle) is equal to the logarithm of the number. The device described above and shown in Figure 6 permits to add the approximate logarithms or the mantissa and thence, by bringing the indices of the factor-drums on the helix opposite to the logarithmic division, the index of the result-drum will be brought into coincidence with the concerned turn of helix 73 of the result-drum. From this position, if the indices of the factors are imparted with displacements $nd$ and $n'd$ proportional to the characteristics of the numbers, the result-index is displaced by $(n+n')d$, i. e. by a distance proportional to the characteristic of the result. Due to the arrangement of the graduations described above, the indices will thus indicate the concerned turn of helix 73 and on number 74, the position of the point.

The device shown in Figure 8 has been modified to avoid giving to the central drum a width double that of the factor-drums. This device comprises the same control parts 57', 58', 59' and 60' similar to the like members shown in Figure 6 controlling threaded rods 55' and 56'. On rod 55' moves a nut 61' carrying an index 63', 67' sliding in a slot 65' of a tube 66'. The threaded rod 55' is extended by a square rod 75 terminated by a cylindrical spindle 76 penetrating into a bore in the threaded rod 56'.

The threaded rods 55' and 56' are threaded with the same pitch and in the same direction. On threaded rod 56' is mounted an internally and externally threaded sleeve 78 which carries at its end towards the control parts an index 62', 68' also sliding in slot 65' of tube 66'. On said sleeve 78 is engaged another internally threaded sleeve 79 which is externally threaded with a pitch equal and of opposite direction to that of the external thread of sleeve 78. Said sleeve has a square hole engaging the rod 75 and is thus rotatively driven by rod 55'. Finally sleeve 79 co-operates with a sleeve 80 internally threaded and slidable but non-rotatable and which carries the eclipsable indices which will be described hereinafter.

It may be seen that if threaded rod 56' is rotated, sleeve 78 slides longitudinally and drives in the same direction sleeves 79 and 80, and therefore the indices integral with the latter. If the threaded rod 55' is rotated it drives rotatively sleeve 79 which moves in the same direction as nut 61' but by half the distance, but simultaneously to the screwing of sleeve 79 by half said distance on sleeve 78, sleeve 80 also screws by half said distance on sleeve 79 and the overall displacement of sleeve 80 and thence of the indices carried thereby is equal to the displacement of nut 61'.

Sleeve 80 carries on one of its generatrices and at a distance apart equal to the development, along the generatrix of the cylinder, of the logarithmic helix of base 10 reduced by $d$, two indices 81 and 82. Said indices are pivoted on yokes 83 integral with sleeve 80. They are held in vertical position by springs 84 and each of them is integral with a finger 85 which turns it down horizontally against the action of the spring when it comes into contact with the top face 87 of passage 88. Said passage 88 which surmounts the tubular casing 65' is intended to act as a guide for the indices 81 and 82 and also for their yokes 83, thus preventing sleeve 80 from rotating. It is clear that, with devices of this type, the possibility of having the point device shifted past the range of the mark number of the logarithmic division must be taken into account. In this case, it will be necessary to add at the right of this number as many zeros as there are widths $d$ between the end right figure and the point mark.

Figure 12:
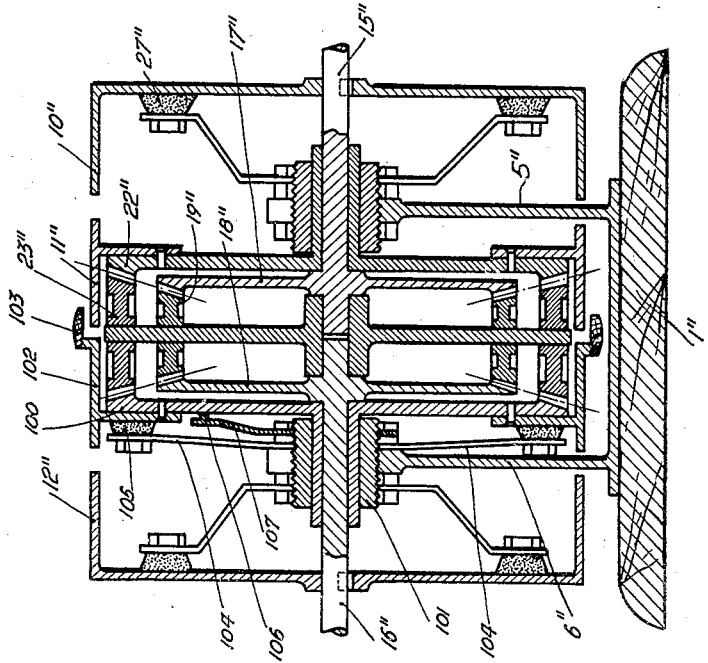
Fig. 12 is a cross-sectional view corresponding to Fig. 2 of a machine adapted to 4-term calculation.

The calculating machine shown in Figure 12 is modified to permit the introduction of a fourth term. The principal parts of the machine described above may be found again in said figure with the same reference numbers, suffixed by double primes viz. the three drums $10''$, $11''$ and $12''$ carrying the logarithmic scales, the drums $10''$ and $12''$ being integral with shaft members $15''$ and $16''$ carrying toothed discs $17''$ and $18''$ opposed to one another and which constitute the sun-wheels of a differential gear; the planet-wheels $19''$ and $23''$, the planet-wheel $23''$ co-operating with sun-wheel $22''$ integral with drum $11''$. But for the stationary sun-wheel cooperating with the planet-wheel $23''$ there is substituted a sun-wheel 100 rotatively mounted in a sleeve 101 and integral with an additional drum 102. Said drum is controlled by a crown 103. A brake 104 constituted by a spring 105 having four arms provided with shoes, similar to brakes 27 but stronger, locks drum 102. A half-ball 106 carried by a spring 107 and adapted to be engaged into a notch of the rear flange of sun-wheel 100 permits a slight locking of drum 102 when graduation $10^n$ is on the index line.

The logarithmic graduation carried by drum 102 is helically wound in the direction opposite to that carried by the other drums. The first factor is put in on said drum 102. The two other factors may then be put in on drums $10''$ and $12''$ and the result is read on drum $11''$.

Figure 14:
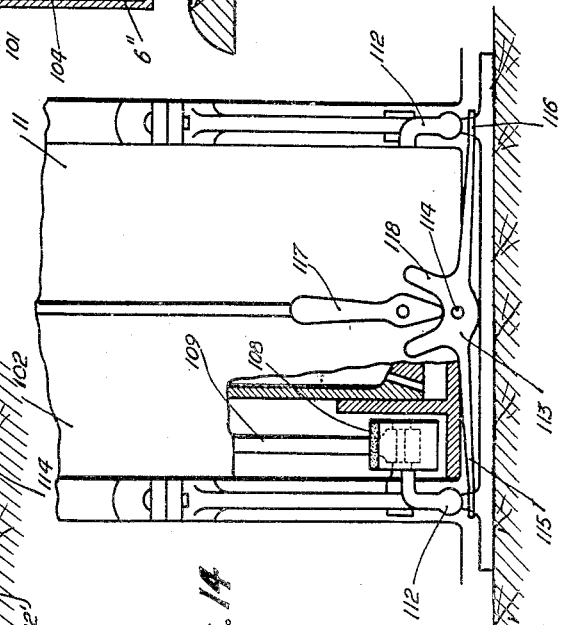
Fig. 14 is a longitudinal view with parts broken away, of the machine shown in Fig. 13.
Figure 13:
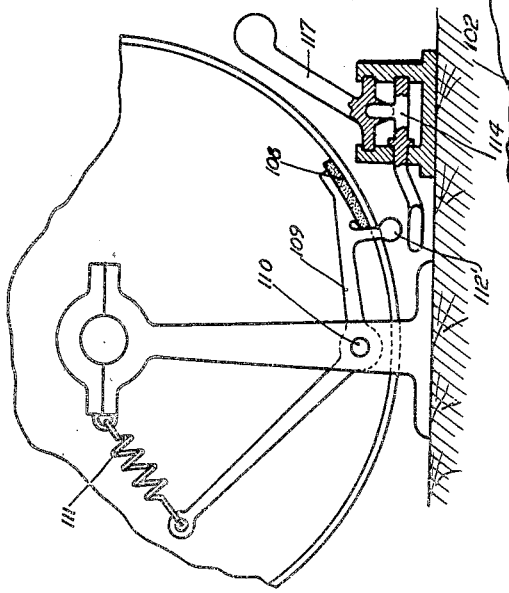
Fig. 13 is a cross sectional view of the brake control in a machine derived from Fig. 12.

The 4-drums machine described above is adapted to multiple calculations but for effecting these calculations it is necessary to be able to lock alternately one or the other of the central drums. Brake 104, 105 is then substituted for by the following device (Figures 13 and 14).

This device is constituted for each drum by a shoe 108 carried by a lever 109 pivoted at 110 on the frame, said shoe being forced against the inner wall of the drum by a spring 111. Each lever carries a heel 112 which projects into the gap between the two end drums and the two central drums. A lever 113 rockingly mounted at 114 co-operates at its ends 115 and 116 with said heels. A lever 117 co-operates with the cam-like portions 118 of lever 113 and ensures the rocking thereof as well as the correlative lifting of either one of shoes 108. Said portion 108 has such a shape that it ensures the end-of-travel locking in either direction.

A machine provided with this locking device permits the performance of a series of multiplications and divisions. It is possible, in effect, to block the result, on either drum and reset to zero one of the factor-drums.

Assuming the operation:

$$\frac{a \times b \times c}{d \times e}$$

is to be effected. Drum 11'' is locked by moving lever 117 towards the right, then by rotating drum 10'' in the backward direction, that logarithmic division of drum 102 which corresponds to $a$ is brought opposite the index line 14'''; drum 102 is then locked by pivoting lever 117 toward the left; drum 10'' is then brought to the logarithmic division corresponding to $b$, and there is obtained on drum 11'' the result $a \times b$. Putting the factor $c$ in on drum 12'' there is obtained on drum 11'' the result $a \times b \times c$. Drum 11'' is then locked and the drums 10'' and 12'' are brought back respectively to the logarithmic divisions $d$ and $e$ and there is then read directly on drum 102 the desired result; in effect, this drum has been rotated in the direction of its logarithmic scale by an arc the length of which corresponds to $+a$ and then by arcs corresponding to $b-d$ and $c-e$. This calculation is only given as a mere illustration and it is obvious that it may be varied at will.

It is obviously possible to adapt the point-indexing device described above to the 4-drum machine which has just been described. An example of such a device is shown in Figures 15 to 17. This device comprises as previously the same threaded rods 55''' and 56''' with their actuating means and their brakes 57''', 58''' and 59''', 60''' respectively as in Figure 6 driving the indexes 61''', 63''', 67''' and 62''', 64''', 68''' opposite to drums 10 and 12 as in Fig. 6. With these threaded rods co-operates a rod 69''' one end of which of square cross-section is engaged into an axial square bore of rod 55''' and the other end of which is engaged in the axial inner thread of rod 56'''. The threads are similar to those of the device of Figure 6 and there is thus obtained a displacement of rod 69''' which is the sum of the displacements of the indices 67''' and 68'''.

Around rod 69''', between the threaded rods 55''' and 56''' is mounted a sleeve 120 threaded in its portion 121 which is located opposite to the additional drum 102 (Figure 12). Said sleeve may be rotated by a toothed-wheel 122 formed at its surface and which co-operates with a toothed-wheel 123 integral through a spindle 124 with another toothed-wheel 125 which may be rotatively driven by toothed-wheel 126 integral with the knurled knob 127 braked by brake 128. On portion 121 is secured a nut 129 carrying an index 130 which is rotatively locked by the edges of slot 65''' of casing 66''', in which slot it may slide. Sleeve 120 is provided with two diametrically opposed slots extending along its non-threaded portion and acting as a guide for two parts 131—132 which are engaged into an abutment constituted by two flanges 133 on spindle 69''' and integral with an outerly threaded sleeve 134. On said sleeve is mounted a nut 135 with an index 136 similar to nut 129 and index 130 described above.

Threaded sleeve 134 will be then driven longitudinally by the displacement of rod 69''', parts 131, 132 sliding in the slots of sleeve 120. This displacement will be equal to the sum of the displacements of indices 67'''' and 68'''' and index 136 will be imparted with the same displacement; moreover, if sleeve 120 is rotated which displaces index 130, sleeve 134 will be also rotatively driven and nut 135 will be displaced by the same length as nut 129. The displacement of nut 135 and thence of index 136 will thus be the sum of the displacements of indices 67''', 68''' and 130.

A calculating machine has been diagrammatically shown in Figures 18, 18a, 19 and 19a, on which the logarithmic scales are plotted on the drums while the figures are carried over on endless tapes.

The machine then comprises three or four drums 140 interconnected by a differential device such as described above. Over these drums run endless tapes such as 141 which are wound on cylinders 142 freely rotatably mounted in the casing 143 located at the rear of drums 140; in front of these drums is disposed a glass strip 13''' carrying an index line and, if required, a point-indexing device diagrammatically shown at 144. On each drum are engraved side-by-side, and over one drum revolution, fragments of logarithmic scales without numerical marks, the assembly of these scale fragments giving the whole logarithmic scale. Drum 140 comprises, on the other hand, near its edges, teeth 145 which co-operate with perforations carried by the tape. The tape also carries numerical marks 146 the spacing of which corresponds to the logarithmic scale used; the length of the tape may be any multiple of the length of the logarithmic scale, but it is sufficient that it is equal to said length. Moreover, in this tape are provided transparent sighting-slits such as 147 which expose at each moment that fragment of logarithmic scale 148 which corresponds to the numerical graduation carried by the side portion of the tape.

An angular rotation of drum 140 carries away a length of tape equal to the arc described; the device giving an addition of the angles and hence of the arcs, thus ensures in this case an addition of the tape lengths. The drawbacks which might result from the flexibility of the tape are overcome, on the one hand, by the driving system with teeth and perforations, and on the other hand by the fact that the logarithmic divisions are carried by the drums proper.

This tape device may be modified for using tapes wound on a drawback cylinder or tapes carrying a logarithmic scale wound on several lengths of endless tapes according to the above adopted principle for the logarithmic scales engraved on the cylinders; there will then be obtained across the width of the tape several marks of the logarithmic scale.

There may be substituted for the index-driving device shown in Figures 6 to 11 the cable device shown in Figures 20, 20a, 21 and 22.

This device comprises essentially a longitudinal cable 150 integral with the index-carrying rule 151 of the result-drum. Said cable runs at its ends over two pulleys 152, 153 carried by two rules 154, 155, respectively which carry at their other end another pulley 156, 157. Cable 150 is wound over two pulleys 158, 159 fixed with respect to the frame and then over pulleys 157 and 156, its ends being anchored at 160 at a fixed point of the frame. The needles 161 and 162 of the factor-drums are secured on the portions 150' of the cable located between the pulleys 156 and 158, and 157 and 159 respectively.

It may be seen that if rule 155 is moved in one direction, and thence pulleys 153 and 156, the portion 150' of the cable located between pulleys 158 and 157 and thence needle 151 integral therewith is displaced in the same direction by a length double thereof, this displacement of a point of said length 150' of the cable corresponds to an equal displacement of any point of cable portion 150, thence of needle 151. The same is true for rule 154. This device thus provides the displacement of the result needles, which displacement is the sum of the displacements of both factor-needles, required for the indicating device described above.

The rules 154, 155 are actuated by a threaded screw 163, 164, respectively controlled by a knob, not shown, and co-operating with a nut 165 of the rule and the rotation of which is limited by an abutment 166, 167.

In this device the indices of the center drum disappear without resorting to needles pivoted on their base.

The disappearance, in effect, is obtained, thanks to the downward shift (by ½ cm., e. g.) of the mark line of the center drum, the points of the concerned indices 151 being vertically shifted by ½ cm. with respect to the point of the indicies 161 and 162 of the end drums. Two masks 168, 169, arranged horizontally in front of the end drums only, about ½ cm. under the mark line, mask the indices 151 of the center-drum during their travel in front of the end drums, while providing under the mark-line a gap sufficient for permitting the normal reading of the indices 161, 162.

What I claim is:

1. A calculating machine based on the principle of logarithmic calculation and comprising at least three co-axial revolution surfaces connected together by at least one differential device imparting to one of said revolution surfaces a rotation equal to the sum of the rotations of the other revolution surfaces, logarithmic scales plotted on said surfaces, a stationary mark and movable indices moving in the neighborhood of said stationary mark, each in front of one of said revolution surfaces and means for relating the displacements of said indices so that the displacement of that one which is in front of said one of said revolution surfaces is the sum of the displacements of the others.

2. A calculating machine based on the principle of logarithmic calculation and comprising three co-axial drums, each one of two of said drums being each integral with a sun-wheel of one differential gear, the third drum carrying a toothed disc constituting, together with a fixed disc two sun-wheels of a second differential gear, the planet-wheels of said two differential gears being rotatively mounted on the same frame, logarithmic scales plotted on said drums, a fixed mark parallel to the axis of the drums, movable indices moving parallel to, and in the neighborhood of said fixed mark, each in front of one drum, and means for relating the displacements of said indices so that the displacement of the index located in front of the third drum is the sum of the displacements of the indices located in front of the two other drums.

3. A calculating machine according to claim 2, in which each one of the movable indices is constituted by the point of intersection of two helices plotted on two co-axial cylinders constituting an indexing device, the number of turns of the two said helices differing from one another by one unit, means being provided to set into rotation one of the cylinders of each of the indices corresponding to the two first drums, and means for imparting to one of the cylinders of the indexing device of the third drum a relative rotation equal to the sum of the rotations of the movable cylinders of the two other indexing devices.

4. A calculating machine according to claim 2, in which each one of the movable indices is constituted by one finger, each of the fingers corresponding to the two first drums being carried by a nut locked against rotation and co-operating with a threaded rod, the finger corresponding to the third drum being secured on a base rotatively mounted on a rod rotatively driven but longitudinally movable with respect to one of the threaded rods and screwing into a thread rotatively fast upon the other rod.

5. A calculating machine according to claim 2, in which each one of the movable indices is constituted by one finger, the finger corresponding to the third drum being integral with a longitudinal cable running over two first pulleys integral with two rules, then over two pulleys integral with the frame and then over two other pulleys secured at the other end of the said rules, the fingers corresponding to the two first drums being each secured on one of the cable portions comprised between the fixed pulleys and the first pulleys integral with the rules, and means for moving both said rules.

6. A calculating machine based on the principle of logarithmic calculating and comprising four co-axial drums, each one of two of said drums being integral with a sun-wheel of one differential gear and the two other drums with the sun-wheels of a second differential gear, the two planet-wheels of both said differential gears being rotatively mounted on a common frame, logarithmic scales arranged in one sense for three of said drums and reversed in sense for the fourth one, plotted on the surfaces of said drums, a fixed mark parallel to the axis of the drums, movable indices moving parallel to and in the neighborhood of said fixed mark, each in front of one drum, and means for relating the displacements of said indices so that the displacement of that one which is in front of said fourth drum is the sum of the displacements of the indices located in front of the three other drums.

7. A calculating machine according to claim 6, in which each one of the movable indices is constituted by one finger, the fingers corresponding to three of the drums being each carried by a nut locked against rotation and co-operating with a threaded rod, the finger corresponding to the fourth drum being carried by a nut locked against rotation and co-operating with a threaded member rotatively mounted on one of said threaded rods rotatively driven but movable longitudinally with respect to another of the above mentioned threaded rods and screwing into a thread integral with a third threaded rods, said threaded member being besides relatively connected with said one of said threaded rods.

8. A calculating machine based on the principal of logarithmic calculation and comprising at least three co-axial drums connected together by at least one differential device imparting to one of said drums a rotation equal to the sum of the rotations of the other drums, tapes winding on said drums and carrying logarithmic scales, a fixed mark, and a movable index moving in front of each one of the tapes carried by said drums, and means for relating the displacements of said indices so that the displacement of that one which is in front of said one of said drums is the sum of the displacements of the other.

PIERRE JULES LOUIS JULLIEN.

REFERENCES CITED

The following references are of record in the file of this patent:

UNITED STATES PATENTS

| Number | Name | Date |
|---|---|---|
| 1,306,379 | Horine | June 10, 1919 |
| 2,285,774 | Horner | June 9, 1942 |
| 2,454,987 | Brandner | Nov. 30, 1948 |

FOREIGN PATENTS

| Number | Country | Date |
|---|---|---|
| 363,010 | Germany | Nov. 6, 1922 |
| 370,993 | Germany | Mar. 9, 1923 |

OTHER REFERENCES

Pages 10 and 11 of Brown's "Mechanical Movements," published by Brown and Brown, 262 Broadway, New York.